US010334522B2

(12) United States Patent
Zakrzewski et al.

(10) Patent No.: US 10,334,522 B2
(45) Date of Patent: Jun. 25, 2019

(54) BATTERY USE MANAGEMENT FOR WIRELESS NETWORKS (71) Applicant: Simmonds Precision Products, Inc., Vergennes, VT (US)

(72) Inventors: Radoslaw Zakrzewski, South Burlington, VT (US); Jonathan Wieman, Ferrisburgh, VT (US)

(73) Assignee: Simmonds Precision Products, Inc., Vergennes, VT (US)

(*) Notice: Subject to any disclaimer, the term of this patent is extended or adjusted under 35 U.S.C. 154(b) by 0 days.

(21) Appl. No.: 15/623,465

(22) Filed: Jun. 15, 2017

(65) Prior Publication Data
US 2018/0368064 A1 Dec. 20, 2018

(51) Int. Cl.
H04W 72/04 (2009.01)
H04W 52/02 (2009.01)
H04W 84/18 (2009.01)
H04W 4/38 (2018.01)

(52) U.S. Cl.
CPC ..... *H04W 52/0216* (2013.01); *H04W 52/0225* (2013.01); *H04W 4/38* (2018.02); *H04W 84/18* (2013.01)

(58) Field of Classification Search
CPC ......... H04W 52/0219; H04W 52/0261; H04W 52/0277; H04W 52/0216; H04W 84/18
See application file for complete search history.

(56) References Cited

U.S. PATENT DOCUMENTS

| 9,619,999 | B2 | 4/2017 | Stephanson | |
| 2007/0185660 | A1* | 8/2007 | Anderson | H04W 52/0219 702/41 |
| 2008/0150714 | A1 | 6/2008 | Bauer | |
| 2009/0147714 | A1* | 6/2009 | Jain | H04W 52/0216 370/311 |
| 2014/0100816 | A1* | 4/2014 | Rogoff | G01D 3/032 702/176 |
| 2015/0022373 | A1* | 1/2015 | Bommer | G08C 17/02 340/870.11 |
| 2016/0041013 | A1 | 2/2016 | Waters et al. | |
| 2018/0108188 | A1* | 4/2018 | Canning | H04L 67/12 |

OTHER PUBLICATIONS

Extended European Search Report for EP Application No. 18177335.9, dated Oct. 15, 2018, 6 pages.

* cited by examiner

*Primary Examiner* — Hassan Kizou
*Assistant Examiner* — Mahbubul Bar Chowdhury
(74) *Attorney, Agent, or Firm* — Kinney & Lange, P.A.

(57) ABSTRACT

Redundant wireless sensor networks include a plurality of wireless sensors and a wireless data concentrator. The plurality of wireless sensors sense a parameter and transmit sensor signals representative of the parameter sensed. The wireless data concentrator receives the sensor signals and adjusts the transmission schedules of at least one of the plurality of wireless sensors based on a change in operating status of one or more of the plurality of wireless sensors.

14 Claims, 4 Drawing Sheets

BATTERY USE MANAGEMENT FOR WIRELESS NETWORKS

BACKGROUND

This disclosure relates generally to wireless sensor networks. More particularly, this disclosure relates to battery use management of wireless sensors in wireless networks. Wireless sensors often use a battery or some other finite energy storage device for power. When the battery runs out of energy, the wireless sensor ceases to function. To ensure that all wireless sensors of the network function without interruption, batteries of wireless sensors are typically replaced before they are fully depleted.

SUMMARY

A wireless sensor network comprises a plurality of wireless sensors and a wireless data concentrator. The plurality of wireless sensors sense at least one parameter and transmit sensor signals representative of the at least one parameter sensed. The wireless data concentrator receives the sensor signals and adjusts the transmission schedules of at least one of the plurality of wireless sensors based on a change in operating status of one or more of the plurality of wireless sensors.

A method comprises sensing at least one parameter with a plurality of wireless sensors; wirelessly transmitting sensor signals representative of the at least one parameter sensed from the plurality of wireless sensors to a wireless data concentrator; and adjusting, using the wireless data concentrator, a transmission schedule of at least one of the plurality of wireless sensors in response to a change in operating status of one or more of the plurality of wireless sensors.

DETAILED DESCRIPTION

Figure 1:
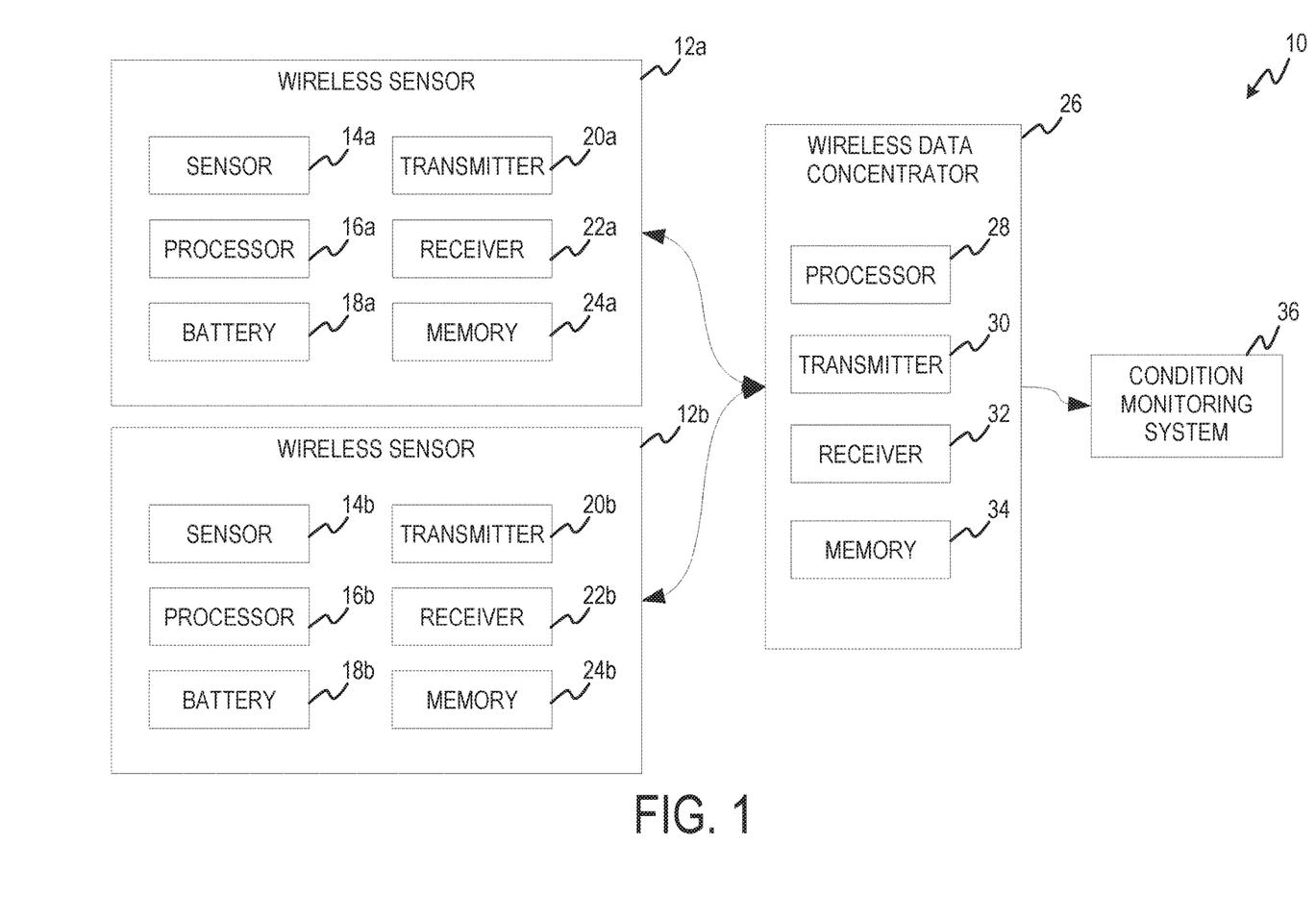
FIG. 1 is a diagram of a wireless data communication network according to an embodiment of the present invention.

FIG. 1 is a diagram of wireless sensor network 10, which includes first wireless sensor 12a and second wireless sensor 12b. First wireless sensor 12a includes sensor 14a, processor 16a, battery 18a, transmitter 20a, receiver 22a, and memory 24a. Second wireless sensor 12b includes sensor 14b, processor 16b, battery 18b, transmitter 20b, receiver 22b, and memory 24b. Wireless sensor network 10 further includes wireless data concentrator 26, which includes processor 28, transmitter 30, receiver 32, and memory 34. Wireless sensor network 10 also includes condition monitoring system 36.

First wireless sensor 12a and second wireless sensor 12b are located in a same region of an aircraft, or other structure, such that they can both sense a parameter of the region without significant variation from one another. First wireless sensor 12a and second wireless sensor 12b communicate wirelessly with wireless data concentrator 26. Wireless data concentrator 26 may be in the same region as first wireless sensor 12a and second wireless sensor 12b, or in another region. Wireless data concentrator 26 communicates with condition monitoring system 36. Wireless data concentrator 26 can communicate with condition monitoring system 36 wirelessly or through a wired connection.

Processor 28 of wireless data concentrator 26 is configured to execute instructions stored in memory 34 that instruct processor 28 to carry out the processes executed by wireless data concentrator 26 described herein. Wireless data concentrator 26 is configured to maintain a transmission schedule of the region. Transmission schedules include a transmission rate and a sensing rate. Maintaining the transmission schedule includes determining an overall transmission schedule or a region schedule. A first, second, and third transmission schedule are determined, each transmission schedule including a transmission rate and a sensing rate. The third transmission and sensing rate is equal to a region transmission rate and sensing rate. The first transmission and sensing rates and the second transmission and sensing rates are some fraction of the region transmission rate and sensing rate such that the combination of the first and second rates are equal to the region rate. Wireless data concentrator 26 is configured to initialize first wireless sensor 12a with the first transmission rate and the first sensing rate. The first transmission rate defines how often first wireless sensor 12a transmits sensing data to data wireless data concentrator 26. The first sensing rate defines how often first wireless sensor 12a makes a sensing. Wireless data concentrator 26 is configured to transmit the first transmission rate and first sensing rate instructions to first wireless sensor 12a using transmitter 30. The first transmission rate and first sensing rate can be stored in memory 34. Wireless data concentrator 26 is configured to receive data from first wireless sensor 12a. Wireless data concentrator 26 receives data from first wireless sensor 12a using receiver 32. The first transmission rate may include a time slot to be used in a time division multiple access scheme. The first transmission rate and the first sensing rate can be the same rate. A sensing can be scheduled before a transmission such that one sensing is taken by first wireless sensor 12a prior to each transmission. The first transmission rate and the first sensing rate can be different, such that multiple sensor signals are taken by first wireless sensor 12a before each transmission.

Wireless data concentrator 26 is configured to initialize second wireless sensor 12b with the second transmission rate and the second sensing rate. Wireless data concentrator 26 is configured to transmit the second transmission rate and the second sensing rate to second wireless sensor 12b using transmitter 30. The second transmission rate and second sensing rate can be stored in memory 34. Wireless data concentrator 26 is configured to receive data from second wireless sensor 12b. Wireless data concentrator receives data from second wireless sensor 12b using receiver 32. The second transmission rate may include a time slot to be used in a time division multiple access scheme. The second transmission rate and the second sensing rate can have the same rate. A sensing can be scheduled before a transmission such that one sensing is taken by second wireless sensor 12b prior to each transmission. The second transmission rate and the second sensing rate can be different, such that multiple sensor signals are taken by second wireless sensor 12b before each transmission.

Processor 16a of wireless sensor 12a is configured to execute instructions stored in memory 24a that instruct processor 16a to carry out the processes executed by wireless sensor 12a described herein. First wireless sensor 12a is configured to receive the first transmission rate and the first sensing rate from wireless data concentrator 26. First wireless sensor 12a can receive the first transmission rate and the first sensing rate using receiver 22a. First wireless sensor 12a is configured to sense a parameter of the region at the received first sensing rate. First wireless sensor 12a can sense the parameter using sensor 14a. Parameters sensed using sensor 14a can include temperature, pressure, humidity, vibration, or any other parameter that needs to be monitored by condition monitoring system 36. First wireless sensor 12a can store the sensing in memory 24a. Wireless sensor 12a is configured to transmit sensor signals to wireless data concentrator 26 at the first transmission rate. Wireless sensor 12a transmits the sensor signals to wireless data concentrator 26 using transmitter 20a. Wireless sensor 12a is powered by battery 18a. While a battery is shown, it should be understood that wireless sensor 12a can use any portable energy storage device such as a fuel cell or a supercapacitor.

Processor 16b of wireless sensor 12b is configured to execute instructions stored in memory 24b that instruct processor 16b to carry out the processes executed by wireless sensor 12b described herein. Second wireless sensor 12b is configured to receive the second transmission rate and the second sensing rate instructions from wireless data concentrator 26. Second wireless sensor 12b can receive the second transmission rate and the second sensing rate using receiver 22b. Second wireless sensor 12b is configured to sense the parameter of the region at the received second sensing rate. Second wireless sensor 12b can sense the parameter using sensor 14b. Parameters sensed using sensor 14b can include temperature, pressure, humidity, vibration, or any other parameter that needs to be monitored by condition monitoring system 36. Second wireless sensor 12b can store the sensing in memory 24b. Wireless sensor 12b is configured to transmit sensor signals to wireless data concentrator 26 at the second transmission rate. Wireless sensor 12b can transmit the sensor signals to wireless data concentrator 26 using transmitter 20b. Wireless sensor 12b is powered by battery 18b. While a battery is shown, it should be understood that wireless sensor 12b can use any portable energy storage device such as a fuel cell or a supercapacitor.

First wireless sensor 12a and second wireless sensor 12b are redundant sensors that measure the same parameter of the same region and at different rates. First wireless sensor 12a and second wireless sensor 12b also transmit their sensor signals to wireless data concentrator 26 at different rates. Measuring and transmitting at different rates allows first wireless sensor 12a and second wireless sensor 12b to have different sleep/wake cycles and consume energy at different rates. Sleep/wake cycles are dependent on sensing and transmission rates. When first wireless sensor 12a and second wireless sensor 12b are not taking a sensing or transmitting data, they can operate in a sleep or reduced power mode. This allows for energy conservation in an effort to prolong battery life. The first transmission rate and first sensing rate being faster than the second transmission rate and the second sensing rate allows second wireless sensor 12b to spend more time in sleep mode than first wireless sensor 12a. Battery 18a will deplete faster than battery 18b. When battery 18a is depleted, first wireless sensor 12a will cease to function.

Wireless data concentrator 26 is configured to adjust the transmission rate of second wireless sensor 12b from the second transmission rate and the second sensing rate to the third transmission rate and the third sensing rate in response to determining that an operational status of first wireless sensor 12a has changed from an operative state to an inoperative state. In one example, wireless sensor 12a changing to an inoperative state includes ceasing to transmit data to wireless data concentrator 26. In another example, wireless sensor 12a changing to an inoperative state includes battery 18a being depleted to low power threshold. The third transmission rate is a combination of the first transmission rate and the second transmission rate, such that the combined transmission rate of first wireless sensor 12a and second wireless sensor 12b remains constant even though battery 18a depletes and first wireless sensor 12a ceases to transmit data. Wireless concentrator 26 is further configured to provide a maintenance alert to condition monitoring system 36 in response determining that the operational status of first wireless sensor 12a has changed from an operative state to an inoperative state.

Wireless data concentrator 26 is configured to set first wireless sensor 12a to the second transmission rate and the second sensing rate in response to determining battery 18a has been replaced or recharged, and the operational status of first wireless sensor 12a has changed from an inoperative state to an operative state. Wireless sensor 12a changing from an inoperative state to an operative state includes wireless sensor 12a resuming transmission of the sensor signals. Wireless data concentrator 26 is further configured to set second wireless sensor 12b to the first transmission rate and the first sensing rate in response to first wireless sensor 12a transmitting again. This enables measuring and monitoring of the region at a constant rate and for batteries to be fully depleted before being replaced. This also enables time for battery replacement to be scheduled at a convenient time as the remaining functioning wireless sensor should have significant battery life left when the other sensor depletes its battery and ceases to function. Replacing the battery of a wireless sensor can include replacing an inoperative wireless sensor with a wireless sensor containing a fresh battery.

In an example, first wireless sensor 12a is initialized by wireless data concentrator 26 to transmit to wireless data concentrator 26 twice every three seconds. Second wireless sensor 12b is initialized by wireless data concentrator 26 to transmit to wireless data concentrator 26 once every three seconds. The total transmission rate for the region covered by first wireless sensor 12a and second wireless sensor 12b is thrice every three seconds. Wireless data concentrator 26 is configured to set second wireless sensor 12b to transmit thrice every three seconds in response to determining battery 18a has depleted and first wireless censor 12a has ceased to transmit. Wireless data concentrator 26 is configured to provide a maintenance alert to condition monitoring system 36 in response to determining batter 18a has depleted and first wireless censor 12a has ceased to transmit. Wireless data concentrator 26 is configured to set first wireless sensor 12a to transmit once every three seconds and set second wireless sensor 12b to transmit twice every three seconds in response to determining that battery 18a has been replaced or recharged, and first wireless sensor 12a has resumed transmitting. Very little power is consumed during sleep mode, thus the majority of power consumption takes place in wake mode. At the rates described in this example, wireless sensor 12a will be in wake mode twice as much as wireless sensor 12b after both wireless sensors are first initialized. As a result, battery 18b will be at about half battery life when battery 18a is fully depleted. Setting wireless sensor 12b to the third transmission rate and the third sensing rate enables the rate of measuring and monitoring of the region to remain constant. Additionally, battery 18a can be replaced when convenient, for example at the next scheduled airplane maintenance, because battery 18b retains significant charge. Setting second wireless sensor 12b to the faster transmit and sensing rate after replacing battery 18a ensures that battery 18b will deplete faster than replaced battery 18a, leaving sufficient charge in battery 18a for operation at the total transmission rate for the system when battery 18b is depleted.

Figure 2:
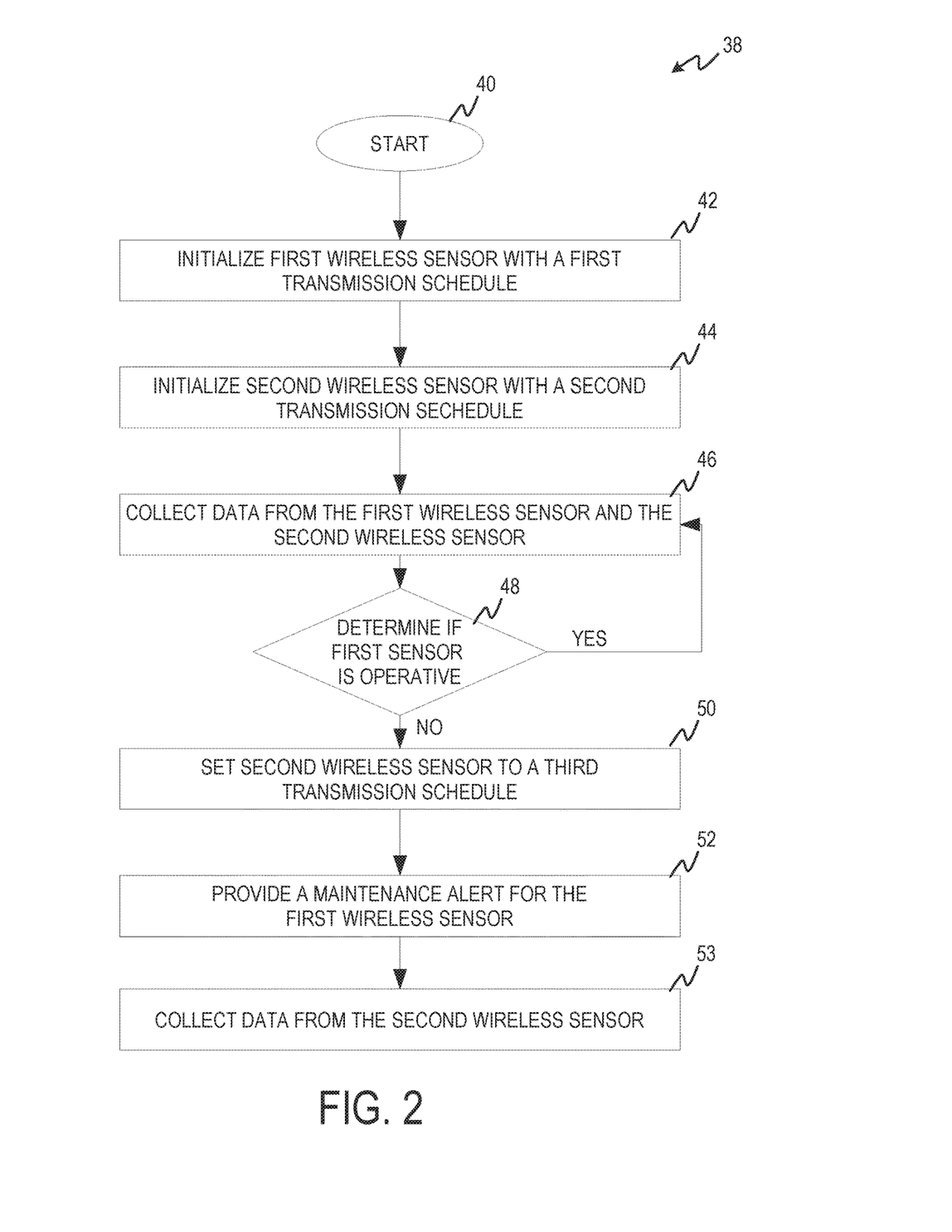
FIG. 2 is a flow diagram depicting a process for redundant sensing using a wireless data communication network.

FIG. 2 is a flow diagram 38 depicting a process for redundant sensing using wireless data communication network 10. At step 42, wireless data concentrator 26 initializes first wireless sensor 12a with a first transmission schedule. Initializing first wireless sensor 12a includes initializing first wireless sensor 12a with a first transmission rate and a first sensing rate. At step 44, wireless data concentrator 26 initializes second wireless sensor 12b with a second transmission schedule. Initializing second wireless sensor 12b includes initializing second wireless sensor 12b with a second transmission rate and a second sensing rate. At step 46, wireless data concentrator 26 collects data from first wireless sensor 12a and second wireless sensor 12b. Collecting data from first wireless sensor 12a and second wireless sensor 12b includes receiving sensor signals from first wireless sensor 12a and second wireless sensor 12b. At step 48, wireless data concentrator 26 determines if first wireless sensor 12a is in an operative state. In one example, determining if first wireless sensor 12a is in an operative state includes determining if one or more sensor signals have been received from first wireless sensor 12a. In another example, determining if first wireless sensor 12a is in an operative state includes the battery life of battery 18a depleting to a low power threshold. If first wireless sensor 12a has responded ("YES" branch of step 48), wireless data concentrator 26 goes to step 46. If first wireless sensor 12a has not responded ("NO" branch of step 48), wireless data concentrator 26 proceeds to step 50. At step 50, wireless data concentrator 26 sets second wireless sensor 12b to a third transmission schedule. Setting second wireless sensor 12b includes setting wireless sensor 12b to a third transmission rate and a third sensing rate. At step 52, wireless data concentrator 26 provides a maintenance alert to condition monitoring system 36. At step 53, wireless data concentrator 26 collects data from second wireless sensor 12b. Collecting data from second wireless sensor 12b includes receiving sensor signals from second wireless sensor 12b.

The process depicted in flow diagram 38 allows for redundant monitoring of a region at a constant rate. First wireless sensor 12a will deplete battery 18a while second wireless sensor 12b has significant battery life left in battery 18b. Maintenance can be scheduled when convenient without changing a battery early or compromising performance.

Figure 3:
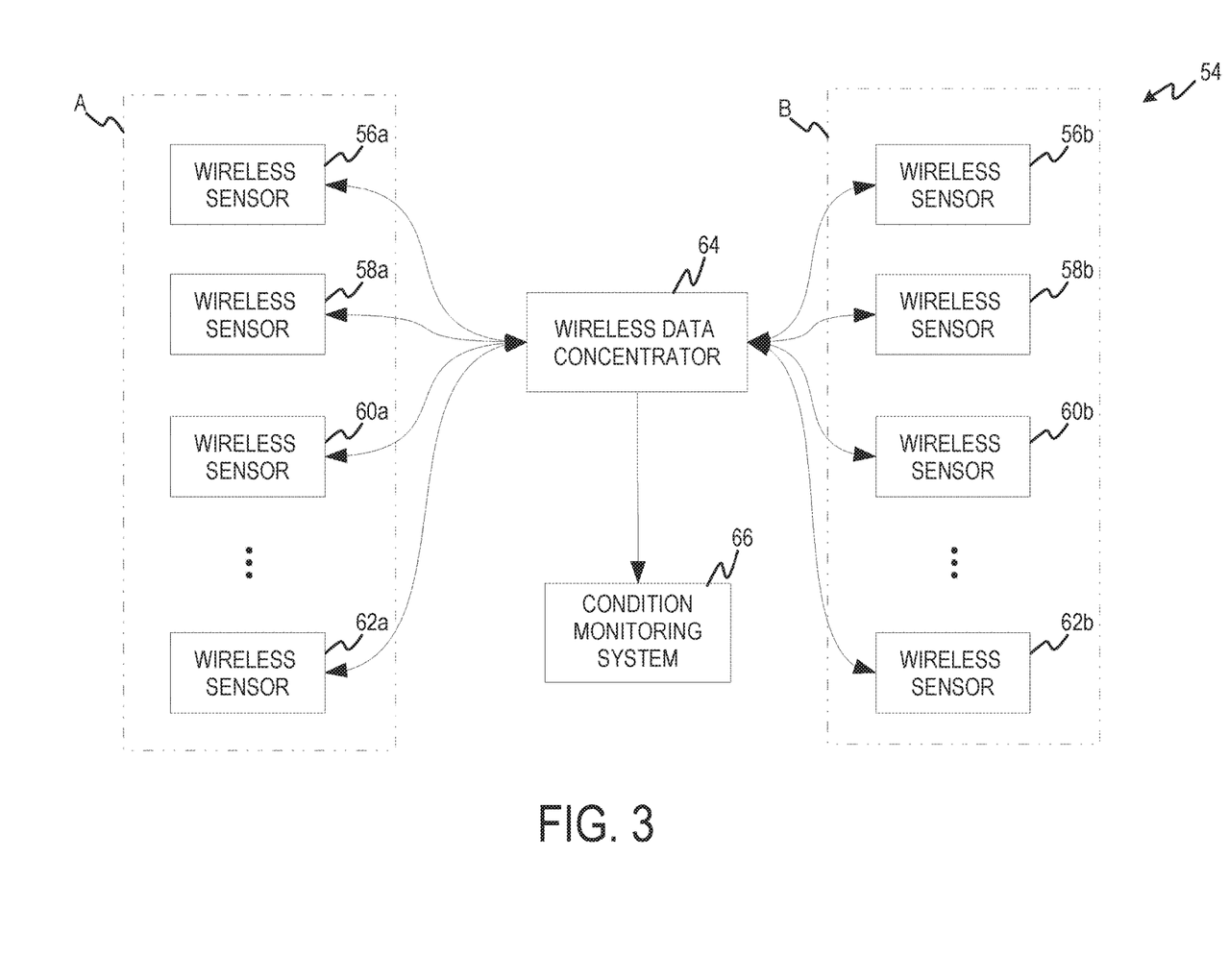
FIG. 3 is a diagram of a multi-sensor wireless communication network according to an embodiment of the present invention.

FIG. 3 is a diagram of multi-sensor wireless communication network 54. Multi-sensor wireless communication network 54 includes wireless sensor group A and wireless sensor group B. Wireless sensor group A includes wireless sensors 56a-62a. While wireless sensor group A is depicted as having four wireless sensors, wireless sensor group A can have any number of wireless sensors. Wireless sensor group B includes wireless sensors 56b-62b. While wireless sensor group B is depicted as having four wireless sensors, wireless sensor group B can have any number of wireless sensors. Multi-sensor wireless communication network further includes wireless data concentrator 64 and condition monitoring system 66.

Wireless sensors from wireless sensor group A are paired by region with wireless sensors from wireless sensor group B. For example, wireless sensor 56a can be paired with wireless sensor 56b in which wireless sensor 56a and wireless sensor 56b monitor the same region. While the example of FIGS. 1 and 2 involved a region monitored by two wireless sensors, it should be understood that the region can be monitored by any number of wireless sensors, such as the wireless sensors from wireless sensor group A and wireless sensor group B. Wireless sensors from wireless sensor group A communicate wirelessly with wireless data concentrator 64. Wireless sensors from wireless sensor group B communicate wirelessly with wireless data concentrator 64. Wireless data concentrator 64 communicates with condition monitoring system 66. Communication between wireless data concentrator 64 and condition monitoring system 66 can be wireless or wired communication.

Wireless data concentrator 64 is configured to initialize the wireless sensors of wireless sensor group A to a first transmission rate and a first sensing rate. Wireless data concentrator 64 is configured to transmit the first transmission rate and the first sensing rate to the wireless sensors of wireless sensor group A. The wireless sensors of wireless sensor group A are configured to receive the first sensing rate and begin taking sensor signals of their corresponding region at the first sensing rate. The wireless sensors of wireless sensor group A are configured to operate in a sleep or low power mode when not scheduled to take sensor signals, transmit data, or receive data. Any combination of various multiplexing schemes can be implemented in wireless multi-sensor network 54. Each wireless sensor of wireless sensor group A can be initialized to a different transmission time slot using a time-division multiple access scheme. Wireless sensors of wireless sensor group A can be assigned a different code for using a code-division multiple access scheme.

Wireless data concentrator 64 is configured to initialize the wireless sensors of wireless sensor group B to a second transmission rate and a second sensing rate. Wireless data concentrator 64 is configured to transmit the second transmission rate and the second sensing rate to the wireless sensors of wireless sensor group B. The wireless sensors of wireless sensor group B are configured to receive the second sensing rate and begin taking sensor signals of their corresponding region at the second sensing rate. The wireless sensors of wireless sensor group B are configured to receive the second transmission rate and begin transmitting the taken sensor signals to wireless data concentrator 64 at the second transmission rate. The wireless sensors of wireless sensor group B are configured to operate in a sleep or low power mode when not scheduled to take sensor signals, transmit data, or receive data. Any combination of various multiplexing schemes may be implemented in wireless multi-sensor network 54. Each wireless sensor of wireless sensor group B can be initialized to a different transmission time slot using a time-division multiple access scheme. Wireless sensors of wireless sensor group B can be assigned a different code for using a code-division multiple access scheme.

The first sensing rate and the first transmission rate can be faster than the second sensing rate and the second transmission rate. The wireless sensors of wireless sensor group A will deplete their batteries faster than the wireless sensors of wireless sensor group B because the wireless sensors of wireless sensor group B spend more time in sleep mode due to the slower sensing and transmission rates. Wireless data concentrator 64 is configured to set a wireless sensor from wireless sensor group B to a third sensing rate and a third transmission rate in response to determining a wireless sensor from wireless sensor group A has depleted its battery and has ceased to transmit data. The wireless sensor from wireless sensor group B is a sensor that monitors the same region as the wireless sensor from wireless sensor group A that ceased functioning. The third sensing rate and the third transmission rate are determined such that the overall sensing rate and transmission rate of the region remains unchanged. In some examples, the third sensing and transmission rate is continually adjusted in response to additional wireless sensors of group A ceasing to transmit data. Wireless data concentrator 64 is configured to continue collecting data from the wireless sensors of multi-sensor wireless communication network 54 that continue to function.

Wireless data concentrator 64 is configured to provide a maintenance alert to condition monitoring system 66 in response to any wireless sensor of multi-sensor wireless communication network 54 ceasing to function. Maintenance can then be scheduled when convenient. For example, maintenance can be scheduled after all wireless sensors from wireless sensor group A have depleted their batteries to allow changing all wireless sensors batteries during the same maintenance period. Wireless data concentrator 64 is configured to set the wireless sensors of wireless sensor group A to the second sensing rate and the second transmission rate in response to the wireless sensors of wireless sensor group A having their batteries replaced and beginning to transmit again. Wireless data concentrator 64 is configured to set the wireless sensors of wireless sensor group B to the first sensing rate and the first transmission rate after setting the wireless sensors of wireless sensor group A to the second sensing rate and the second transmission rate. Setting the wireless sensors of wireless sensor group B to the first sensing rate and the first transmission rate will result in the wireless sensors of wireless sensor group B depleting their batteries before the newly replaced batteries of wireless sensor group A. Wireless data concentrator 64 is configured to continue collecting data from the wireless sensors of multi-sensor wireless communication network 54.

Having different sensing and transmission rates for the two groups of wireless sensors (i.e., group A and group B) causes the batteries of the two groups to be depleted at different times, which allows complete use of the batteries without losing the ability to monitor each region. Whenever the batteries of one group are replaced, the wireless sensors of that group can be set to the slower sensing and transmission rates. The group with partially depleted batteries is set to the faster sensing and transmission rates so that their batteries deplete while the wireless sensors with fresh batteries are able to conserve their battery life. In this manner, each region is continuously monitored at a consistent rate, batteries are not replaced before they are fully depleted, and maintenance can be scheduled when convenient and efficient.

The regions to be monitored can be regions of an airplane, a helicopter, a building, or any other unit or area that utilizes redundant wireless sensor monitoring systems. While a system with two wireless sensor groups is shown in FIG. 3 and described herein, the system and methods described herein can be applied to a multi-sensor wireless network with any number of groups and redundancies.

Figure 4:
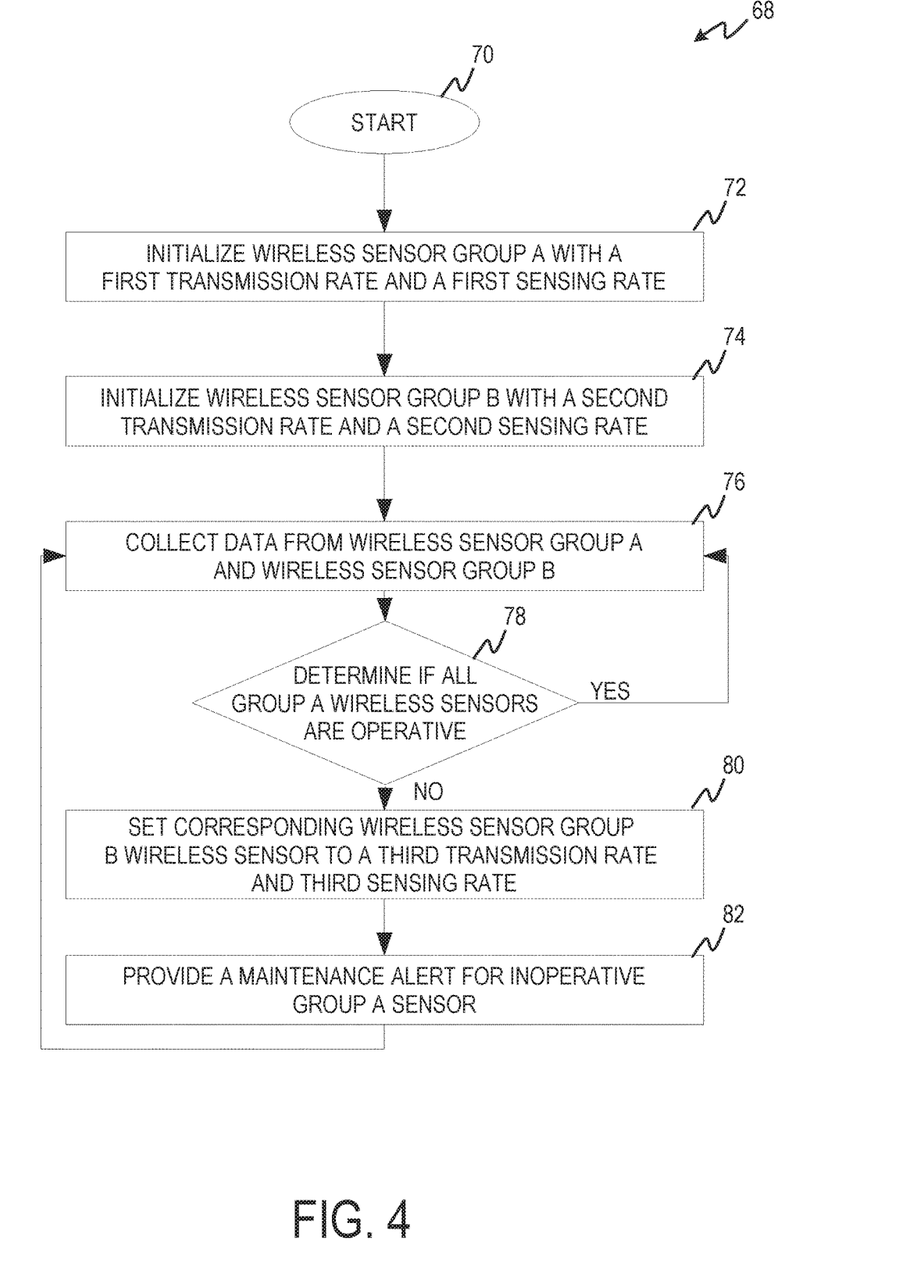
FIG. 4 is a flow diagram depicting a process for redundant sensing using a multi-sensor wireless communication network.

FIG. 4 is a flow diagram 68 depicting a process for redundant sensing using a multi-sensor wireless communication network 54. At step 72, wireless data concentrator 64 initializes wireless sensor group A with a first transmission rate and a first sensing rate. Initializing wireless sensor group A includes transmitting the first transmission rate and the first sensing rate to the wireless sensors of wireless sensor group A. At step 74, wireless data concentrator 64 initializes wireless sensor group B with a second transmission rate and a second sensing rate. Initializing wireless sensor group B includes transmitting second transmission rate and second sensing rate to the wireless sensors of wireless sensor group B. At step 76, wireless data concentrator 64 collects data from wireless sensor group A and wireless sensor group B. Collecting data from wireless sensor group A and wireless sensor group B includes receiving data from the wireless sensors of wireless sensor group A and the wireless sensors of wireless sensor group B. At step 78, wireless data concentrator 26 determines if all wireless sensors from wireless sensor group A are in an operative state. In some example, determining if all wireless sensors from wireless sensor group A are in an operative state includes determining if sensor signals have been received from all wireless sensors of wireless sensor group A. In some examples, determining if all wireless sensors from wireless sensor group A are in an operative state includes determining that the battery life of the batteries of the wireless sensors from wireless sensor group A are above a low power threshold. If all wireless sensors of wireless sensor group A have responded, wireless data concentrator 64 goes to step 76, else wireless data concentrator 64 proceeds to step 80. At step 80, wireless data concentrator 64 sets wireless sensor group B to a third transmission rate and a third sensing rate. Setting wireless sensor group B includes transmitting the third transmission rate and the third sensing rate to the wireless sensors of wireless sensor group B. At step 82, wireless data concentrator 64 provides a maintenance alert to condition monitoring system 66. In some examples, providing a maintenance alert includes removing inoperative wireless sensors from group A. Wireless data concentrator then proceeds to step 76.

Accordingly, multi-sensor wireless network 54 as described herein enables the batteries of all wireless sensors in multi-sensor wireless network 54 to fully deplete their batteries without impacting the overall sensing rate and monitoring of the region. Battery replacement can be scheduled at convenient times, such as when all batteries of one group (i.e., group A or group B) have been depleted, or when other maintenance is scheduled.

Discussion of Possible Embodiments

The following are non-exclusive descriptions of possible embodiments of the present invention.

A wireless sensor network comprising a plurality of wireless sensors that sense at least one parameter and transmit sensor signals representative of the at least one parameter sensed; and a wireless data concentrator that receives the sensor signals and adjusts the transmission schedules of at least one of the plurality of wireless sensors based on a change in operating status of one or more of the plurality of wireless sensors.

The wireless sensor network of the preceding paragraph can optionally include, additionally and/or alternatively, any one or more of the following features, configurations and/or additional components:

The wireless data concentrator can adjust the transmission schedule of the at least one of the plurality of wireless sensors by increasing a transmission rate of the at least one of the plurality of wireless sensors in response to the operating status of one or more wireless sensors changing from an operative state to an inoperative state.

The at least one of the plurality of sensors and the one or more wireless sensors can sense at least one parameter of a same region.

The same region can be a region of a plurality of regions of an aircraft.

The wireless data concentrator can increase the transmission rate of the at least one of the plurality of wireless sensors by increasing the transmission rate of the at least one of the plurality of wireless sensors so that an overall transmission rate of the plurality of wireless sensors remains substantially constant.

The wireless data concentrator can detect the change in operating status of the one or more of the plurality of wireless sensors based upon the transmitted sensor signals.

Each of the plurality of wireless sensors can include a battery that provides power to a respective one of the plurality of wireless sensors for sensing the at least one parameter and transmitting the sensor signals.

The wireless data concentrator can adjust the transmission schedule of the at least one of the plurality of wireless sensors by reducing a transmission rate of the at least one of the plurality of wireless sensors in response to the operating status of one or more of the plurality of sensors changing from an inoperative state to an operative state in response to replacement of the battery of the one or more of the plurality of sensors; and the wireless data concentrator can adjust the transmission schedule of the one or more of the plurality of sensors by increasing a transmission rate of the one or more of the plurality of sensors in response to the operating status of one or more of the plurality of sensors changing from an inoperative state to an operative state in response to replacement of the battery of the one or more of the plurality of sensors.

The plurality of wireless sensors can comprises a first wireless sensor; and a second wireless sensor; and the wireless data concentrator can adjust a transmission schedule of the first wireless sensor by adjusting a transmission rate of the first wireless sensor to be two thirds of a region rate; adjust a transmission schedule of the second wireless sensor by adjusting a transmission rate of the second wireless sensor to be one third of the region rate; and adjust the transmission rate of the second wireless sensor to be the region rate in response to an operative state of the first wireless sensor changing from operative to inoperative.

A method comprising sensing at least one parameter with a plurality of wireless sensors; wirelessly transmitting sensor signals representative of the at least one parameter sensed from the plurality of wireless sensors to a wireless data concentrator; and adjusting, using the wireless data concentrator, a transmission schedule of at least one of the plurality of wireless sensors in response to a change in operating status of one or more of the plurality of wireless sensors.

The method of the preceding paragraph can optionally include, additionally and/or alternatively, any one or more of the following features, configurations and/or additional components:

Adjusting the transmission schedule of the at least one of the plurality of wireless sensors can comprise increasing a transmission rate of the at least one of the plurality of wireless sensors in response to the operating status of the one or more wireless sensors changing from an operative state to an inoperative state.

The at least one of the plurality of sensors and the one or more wireless sensors can sense at least one parameter of a same region.

The same region can be a region of a plurality of regions of an aircraft.

Increasing the transmission rate of the at least one of the plurality of wireless sensors can comprise increasing the transmission rate of the at least one of the plurality of wireless sensors so that an overall transmission rate of the plurality of wireless sensors remains substantially constant.

Detecting, using the wireless data concentrator, the change in operating status of the one or more of the plurality of wireless sensors can be based upon the transmitted sensor signals.

Each of the plurality of wireless sensors can include a battery.

Adjusting the transmission schedule of the at least one of the plurality of wireless sensors can comprise reducing a transmission rate of the at least one of the plurality of wireless sensors in response to the operating status of one or more of the plurality of sensors changing from an inoperative state to an operative state in response to changing the battery of the one or more of the plurality of sensors; and adjusting the transmission schedule of the one or more of the plurality of sensors by increasing a transmission rate of the one or more of the plurality of sensors in response to the operating status of one or more of the plurality of sensors changing from an inoperative state to an operative state in response to changing the battery of the one or more of the plurality of sensors.

Adjusting a transmission schedule of a first wireless sensor of the plurality of sensors, wherein adjusting the transmission schedule of the first wireless sensor comprises adjusting a transmission rate of the first wireless sensor to be two thirds of a region transmission rate; adjusting the transmission schedule of a second wireless sensor of the plurality of sensors, wherein adjusting the transmission schedule of the second wireless sensor comprises adjusting a transmission rate of the first wireless sensor to be one third of the region transmission rate; and adjusting the transmission rate of the second wireless sensor to the region transmission rate in response to the operating status of the first wireless sensor changing from an operative state to an inoperative state.

Adjusting the transmission rate of the second wireless sensor to two thirds the region transmission rate in response to the operating status of the first wireless sensor changing from an inoperative state to an operative state in response to a battery of the first wireless sensor being replaced; and adjusting the transmission rate of the first wireless sensor to one third the region rate in response to the operating status of the first wireless sensor changing from an inoperative state to an operative state in response to a battery of the first wireless sensor being replaced.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A wireless sensor network of an aircraft comprising:
a plurality of wireless sensors that sense at least one parameter and transmit sensor signals representative of the at least one parameter sensed, each of the plurality of wireless sensors including a battery that provides power thereto, the plurality of wireless sensors comprising:

a first wireless sensor group configured to transmit sensor signals at a first transmission rate, the first wireless sensor group including a first wireless sensor configured to sense a first parameter of a first region of the aircraft; and a second wireless sensor group configured to transmit sensor signals at a second transmission rate, the second wireless sensor group including a second wireless sensor configured to sense the first parameter of the first region of the aircraft, the second wireless sensor redundant with the first wireless sensor; and a wireless data concentrator that receives the sensor signals, maintains a transmission schedule of the plurality of wireless sensors, initializes the first transmission rate to be faster than the second transmission rate, and adjusts the first and/or second transmission rates based on a change in operating status of the first wireless sensor.

2. The wireless sensor network of claim 1, wherein the wireless data concentrator increases the second transmission rate in response to the operating status of one or more wireless sensors of the first wireless sensor group changing from an operative state to an inoperative state.

3. The wireless sensor network of claim 2, wherein the wireless data concentrator increases the second transmission rate such that an overall transmission rate of the first and second wireless sensor groups remains substantially constant.

4. The wireless sensor network of claim 1, wherein the wireless data concentrator detects a change in operating status of the first wireless sensor based upon the received sensor signals.

5. The wireless sensor network of claim 1, wherein the wireless data concentrator is configured to:
adjust the first transmission rate in response to the operating status of the first wireless sensor changing from an inoperative state to an operative state in response to replacement of the battery of the first wireless sensor; and
adjust the second transmission rate in response to the operating status of the first wireless sensor changing from an inoperative state to an operative state in response to replacement of the battery of the first wireless sensor.

6. The wireless sensor network of claim 1,
wherein the wireless data concentrator is configured to:
initialize the first transmission rate to be two thirds of a region rate;
initialize the second transmission rate to be one third of the region rate; and
adjust the second transmission rate to be the region rate in response to an operative state of the first wireless sensor changing from operative to inoperative.

7. The wireless sensor network of claim 6, wherein the wireless data concentrator is configured to:
adjust the second transmission rate to two thirds of the region rate in response to the operating status of the first wireless sensor changing from the inoperative state to the operative state in response to a battery of the first wireless sensor being replaced; and
adjust the first transmission rate to one third of the region rate in response to the operating status of the first wireless sensor changing from the inoperative state to the operative state in response to a battery of the first wireless sensor being replaced.

8. A method comprising:
initializing, using a wireless data concentrator, a first wireless sensor group of a plurality of wireless sensors of a region of an aircraft to a first transmission rate, the plurality of wireless sensors each including a battery that provides power thereto;
initializing, using the wireless data concentrator, a second wireless sensor group of the plurality of wireless sensors to a second transmission rate, the second transmission rate slower than the first transmission rate;
sensing a parameter with a first wireless sensor of the first wireless sensor group and a second wireless sensor of the second wireless sensor group, the second wireless sensor redundant with the first wireless sensor;
wirelessly transmitting sensor signals representative of the parameter sensed from the first and second wireless sensors to the wireless data concentrator at the first and second transmission rates, respectively; and
adjusting, using the wireless data concentrator, the first and/or second transmission rate in response to a change in operating status of the first wireless sensor.

9. The method of claim 8, further comprising increasing the second transmission rate in response to the operating status of one or more wireless sensors of the first wireless sensor group changing from an operative state to an inoperative state.

10. The method of claim 9, wherein increasing the second transmission rate comprises increasing the second transmission rate to a selected rate so that an overall transmission rate of the plurality of wireless sensors remains substantially constant.

11. The method of claim 8, further comprising detecting, using the wireless data concentrator, the change in operating status of the one or more of the plurality of wireless sensors based upon the sensor signals received by the wireless data concentrator.

12. The method of claim 8, wherein:
adjusting the first and/or second transmission rate comprises adjusting the first transmission rate in response to the operating status of the first wireless sensor changing from an inoperative state to an operative state in response to changing the battery of the first wireless sensor; and
adjusting the first and/or second transmission rate comprises adjusting the second transmission rate in response to the operating status of the first wireless sensor changing from an inoperative state to an operative state in response to changing the battery of the first wireless sensor.

13. The method of claim 8, further comprising:
initializing the first transmission rate to be two thirds of a region transmission rate;
initializing the second transmission rate to be one third of the region transmission rate; and
adjusting the second transmission rate to be the region transmission rate in response to the operating status of the first wireless sensor changing from an operative state to an inoperative state.

14. The method of claim 13, further comprising:
adjusting the second transmission rate to two thirds of the region transmission rate in response to the operating status of the first wireless sensor changing from an inoperative state to an operative state in response to a battery of the first wireless sensor being replaced; and
adjusting the first transmission rate to one third of the region transmission rate in response to the operating status of the first wireless sensor changing from an inoperative state to an operative state in response to a battery of the first wireless sensor being replaced.

\* \* \* \* \*